(12) United States Patent
Grigoriev

(10) Patent No.: US 7,454,695 B1
(45) Date of Patent: Nov. 18, 2008

(54) METHODS FOR RENDERING TABLES

(75) Inventor: Nikolai Grigoriev, Moscow (RU)

(73) Assignee: RenderX, Inc., Palo Alto, CA (US)

( * ) Notice: Subject to any disclaimer, the term of this patent is extended or adjusted under 35 U.S.C. 154(b) by 1532 days.

(21) Appl. No.: 09/699,572

(22) Filed: Oct. 30, 2000

Related U.S. Application Data

(60) Provisional application No. 60/203,809, filed on May 19, 2000.

(51) Int. Cl.
*G06F 17/00* (2006.01)

(52) U.S. Cl. .................. 715/227; 715/243; 715/255

(58) Field of Classification Search ................ 715/517, 715/509, 523, 227, 243, 255
See application file for complete search history.

(56) References Cited

U.S. PATENT DOCUMENTS

| | | | |
|---|---|---|---|
| 4,503,515 A | 3/1985 | Cuan et al. | |
| 4,648,067 A | 3/1987 | Repass et al. | 715/537 |
| 5,097,418 A | 3/1992 | Nurse et al. | 715/537 |
| 5,111,397 A | 5/1992 | Chirokas et al. | 364/419 |
| 5,323,312 A | 6/1994 | Saito et al. | |
| 5,420,695 A | 5/1995 | Ohta | 358/462 |
| 5,438,512 A | 8/1995 | Mantha et al. | |
| 5,450,536 A | 9/1995 | Rosenberg et al. | 395/148 |
| 5,475,805 A | 12/1995 | Murata et al. | |
| 5,495,561 A | 2/1996 | Holt | 395/114 |
| 5,553,217 A | 9/1996 | Hart et al. | |
| 5,600,771 A | 2/1997 | Hayashi et al. | |
| 5,633,996 A | 5/1997 | Hayashi et al. | |
| 5,845,299 A | 12/1998 | Arora et al. | 715/513 |
| 5,860,073 A | 1/1999 | Ferrel et al. | |
| 5,870,770 A | 2/1999 | Wolfe | 345/805 |
| 5,883,635 A * | 3/1999 | Rao et al. | 345/440 |
| 5,893,127 A | 4/1999 | Tyan et al. | 715/513 |
| 5,895,477 A | 4/1999 | Orr et al. | 707/517 |
| 6,012,098 A | 1/2000 | Bayeh et al. | |

(Continued)

FOREIGN PATENT DOCUMENTS

EP  0094546  11/1983

(Continued)

*Primary Examiner*—Rachna S Desai
(74) *Attorney, Agent, or Firm*—Schwegman, Lundberg & Woessner P.A.

(57) ABSTRACT

Methods are provided for rendering tabular data to a variety of media. A table is received having one or more cells where each cell may span one or more columns and one or more rows. The table is represented as a grid where the grid houses the cells. Moreover, a generic table is provided and represented by one or more formatting commands, which are operable to provide a rendering of the grid to an output media. Furthermore, a set of executable instructions operable to produce formatting commands to render a table is provided including decoupling cells from a table and storing the cells in a matrix. A dimension is associated with each cell in terms of each cell's relative position to other cells within the matrix. Further, formatting commands are outputted and operable to produce a rendition of the table to an output media. Also, a set of executable instructions operable to produce a rendition of a table is provided. Executable commands represent cells of a table, with the commands having parameters defining an outputted cell's dimensions on an output media. Moreover, the commands are executed in parallel to produce a rendition of the table on an output media.

20 Claims, 7 Drawing Sheets

U.S. PATENT DOCUMENTS

| | | |
|---|---|---|
| 6,031,989 A | 2/2000 | Cordell |
| 6,088,708 A | 7/2000 | Burch et al. ................. 715/509 |
| 6,230,170 B1 | 5/2001 | Zellweger et al. ........... 715/512 |
| 6,292,809 B1 * | 9/2001 | Edelman ...................... 715/503 |
| 6,415,305 B1 * | 7/2002 | Agrawal et al. .............. 715/503 |
| 6,584,476 B1 * | 6/2003 | Chatterjee et al. ........... 707/203 |
| 6,613,099 B2 * | 9/2003 | Crim ........................... 715/523 |
| 6,661,919 B2 * | 12/2003 | Nicholson et al. ........... 382/173 |
| 6,694,487 B1 * | 2/2004 | Ilsar ............................ 715/527 |
| 7,024,621 B1 * | 4/2006 | Tolpin ......................... 715/210 |
| 2002/0069221 A1 * | 6/2002 | Rao et al. .................... 707/509 |
| 2008/0077862 A1 | 3/2008 | Tolpin |

FOREIGN PATENT DOCUMENTS

EP   0398477   11/1990

* cited by examiner

METHODS FOR RENDERING TABLES

This application claims priority from U.S. Provisional 60/203,809 filed May 19, 2000, the disclosure of which is incorporated herein by reference.

FIELD OF THE INVENTION

The present invention relates to methods for rendering tabular data and delivering the data in a variety of media.

BACKGROUND OF THE INVENTION

The delivery of information has become omnipresent in recent years with the advent of the Internet and the World-Wide Web (WWW). Moreover, browsers and viewers, which permit the information to be displayed, are now standard with any computing device acquired by a consumer today. By way of example only, some of the WWW browsers include Netscape, Internet Explorer, and others. Often these browsers are equipped with external viewer plugins, which facilitate viewing data in a variety of formats. Information used within a browser is often referred to as browser media. Other types of media, such as paged media exist as well.

Information viewed in a browser is optimally formatted or rendered to be displayed and traversed within the browser (e.g. within the browser media environment). Yet, that same data is not optimally viewed when it is transferred to a paged media. For example, a table of data viewed in a WWW browser may be displayed to user on a single screen, with or without the need to scroll the display screen viewer to the right or down to view the entire table. However, if the same table is selected for print and sent to a printer (e.g. paged media) from within the browser, the table may not reside on a single page when printed. In fact, the table may be truncated with information missing altogether from the table, or information will be separated on multiple pages making it extremely difficult to discern the tabular data provided. This problem of transferring data from a browser or a viewer to a printer is not uncommon and is not limited to tabular data. In fact, anyone who has selected what appeared to be well formatted information for printing in a WWW browser, is often astonished to discover that once the information is outputted to a paged media from the printer, the information is no longer suitable for viewing. Users may be forced to change the page setup within the printer, select landscape modes, and a variety of other choices in an attempt to get a paged media version of what they are currently viewing in a browser media on their computing device s monitor. Yet, modifying printer options will rarely fix the rendering problem associated with tabular data when tabular data is migrated from one media to another media.

Reconciling browser media and page media is problematic, particularly when attempting to render tabular data from a browser media to a paged media. This is so, because often the cells of a table, housed in a browser media data format, such as Hypertext Markup Language, and others, have dimensions and presentation attributes which will exceed the dimensions of a sheet of paper which is to include the cells of the table in an output paged media. To solve this, and many other problems associated with data presentation, an industry wide consortium developed a series of data format standards designed to assist in the transition of data being displayed in different media.

One primary standard is Extensible Markup Language (XML), which displays data in terms of its content devoid of any presentation attributes. Raw XML is not particularly useful in the displaying or the presentation of data in a browser or a paged media by itself, rather, the XML is useful in divorcing the proprietary presentation associated with each media from the data markup, thereby requiring each media to render the raw XML into a useful format prior to displaying it to a user. A number of rendering languages and standards have emerged to assist in this effort, such as by way of example only Extensible Stylesheets Language (XSL), Extensible Stylesheets Language Transformations (XSLT), Cascading Style Sheets (CSS) and others. These rendering languages provide guidelines and utilities to take raw XML and render it to a useful presentation format for a particular media.

Yet, even with the design consistency associated with a standard data format (e.g. XML), and a variety of additional rendering utilities and guidelines (e.g. XSL, XSLT, CSS), tabular data still presents a number of difficult problems when attempting to transfer the tabular data from a browser media to a paged media, since the table dimensions associated with a browser media will significantly vary in the paged media. Therefore, a single application to successfully render tables in both browser and paged media has proven to be elusive. Moreover, it would be cost prohibitive to provide individualized rendering translations for legacy browser media tables in order for them to be successfully transferred to paged media. Accordingly, a more generic approach needs to be developed such that tables may be rendered automatically from one media to another media without the need for individual translating applications.

SUMMARY OF THE INVENTION

Accordingly, an object of the invention is to provide methods for rendering tables to an output media regardless of the complex data layouts required. Moreover, the table rendering may be performed in stream as opposed to in batch mode resulting in improved performance and efficiency. This permits users to truly realize the benefits of seamlessly transitioning between multiple media environments without a loss in presentation or performance during the transition.

To accomplish this and other aspects of the present invention, cells of a table are parsed and stored in a grid, cell dimensions are calculated based on the dimensions of the target media and based on each cell s relative position to other cells within the grid. Further, formatting commands are provided to render the cells to a target media wherein the commands may be executed in parallel, producing improved performance. Moreover, the formatting commands when executed produce a rendering of the table on the target media.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods are provided for rendering tables.

A set of executable instructions to generically render a table for output processing is provided, comprising receiving a table having one or more cells wherein each cell spans one or more columns and rows. Further, the table is represented as a geometric grid wherein one or more positions within the grid house one or more of the cells and providing a generic table represented by one or more formatting commands operable to provide a rendering of the grid to one or more output media.

Moreover, a set of executable instructions operable to produce formatting commands to render a table is provided, comprising decoupling one or more cells from a table and storing the cells in a matrix. Furthermore, a dimension associated with each cell is expressed in terms of each cell s relative position to one another within the matrix. Next, one or more formatting commands operable to produce a rendition of the table on an output media from the matrix are outputted.

Further, a set of executable instructions operable to produce a rendition of a table is provided, comprising representing one or more cells of a table with one or more executable commands wherein each command has one or more parameters defining an outputted cell s dimensions on an output media. Moreover, the commands are executed in parallel to produce a rendition of the table on the output media.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings incorporated in and forming part of the specification, illustrate several aspects of the present invention and, together with their descriptions, serve to explain the principles of the invention. In the drawings.

DETAILED DESCRIPTION

Figure 1:
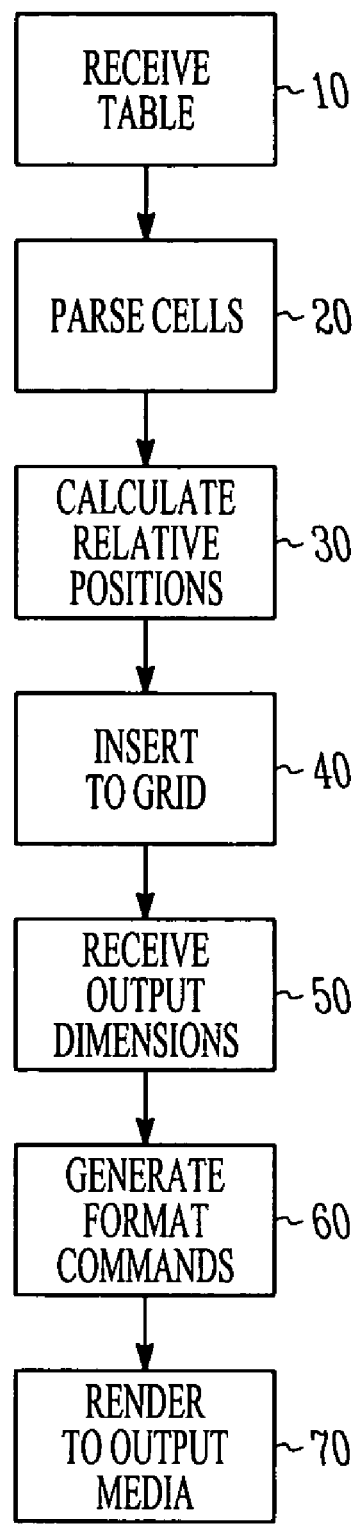
FIG. 1 depicts a flow diagram of a method of rendering tables.

The present invention provides methods for rendering tables. One embodiment of the present invention is implemented using web browser technologies including well-known software programming languages (e.g., C, C++, Java, Active X, Active Server Pages, XSLT, Xpath) and Internet communication protocols (TCP/IP). Of course other programming languages and communications protocols (now known or hereafter developed) may be also readily employed.

Initially, at table is detected within a stream of data or a file by a set of executable instructions operable to detect a table within the data or the file. By way of example only, consider a file with a data markup utilizing XSL where tables are distinguished with a tag such as <fo:table>, once detected the context of the table is pushed to a stack structure within the executable instructions wherein the information regarding the table will be trapped and appropriately recorded.

After a table is detected, the structural pieces of the table are decomposed and parsed by the executable instructions, to identify table cells, columns, rows, headers, and footers. Internally, the individual cells of the table and the requisite information associated with the table, such as number of cells, size of cells, data associated with the cells, and others are stored in a grid, or matrix (e.g. a single or multiple dimensional array). Although as one skilled in the art will appreciate, any internal data structure would suffice as long as the information associated with the table is readily ascertainable. For example, the cells and information associated with the cells could be stored as a binary tree, a hash table, a linked list, or combinations of these and other data structures.

Within the data structure, housing the parsed cells of the table, each cell will carry information that identifies its positions within the table. For example, consider FIG. 3 where an initial table 160 is identified. Table 160 includes 5 cells, cell 1 180, cell 2 190, cell 3 200, cell 4 220, and cell 5 210. Moreover, by way of example only, consider that table 160 is represented in a data markup compliant with XML and includes XSL which renders table 160 to a WWW browser media. Once the XSL file is provided to executable instructions of the present invention, the cells of table 160 are parsed and housed in an internal data structure similar to grid 170.

The dimensions of grid 170, in terms of its length and height may be dictated by the size of the media to which a rendering is to occur. By way of example only, if grid 170 was being used to render to paged media wherein the size of the page was to be 8½ by 11 inches with ½ inch margins on all four sides of the page, then the number of equal sized cells within the grid 170 could be readily determined and configured. Although, as one skilled in the art will appreciate, the number of equally sized grid 170 cells may be determined, by attributes associated with the parsed table 160, such as number of columns encountered and number of rows encountered during parsing. Furthermore, some tabular information contained in the pre-parsed table may identify the exact number of columns and rows associated with the table being parsed.

Once, the number of cells are known, the grid 170 is instantiated and each parsed cell inserted into the grid 170 along with each cell s dimensions with respect to the other cells within the grid. For example, grid 170 includes 9 cell locations of equal size, and cell 1 180 of table 160 has original dimensions which indicate that this particular cell occupies two rows of table 160 and a single column. Therefore, grid 170 depicts a new cell 1 230 within the newly generated grid 170 having the dimension information of [0,0] and [1,0]. The dimension information [0,0] indicates that cell 1 230 in grid 160 occupies the first row 0 of the grid 170 and the first column 0 of the grid 170. Furthermore, the dimension information [1,0] indicates that cell 1 230 in grid 170 occupies the second row 1 of grid 170 and the first column 0 of the grid 170. In a similar way, dimension information is carried with grid 170 for each of the five cells originally depicted in table 160.

Figure 3:
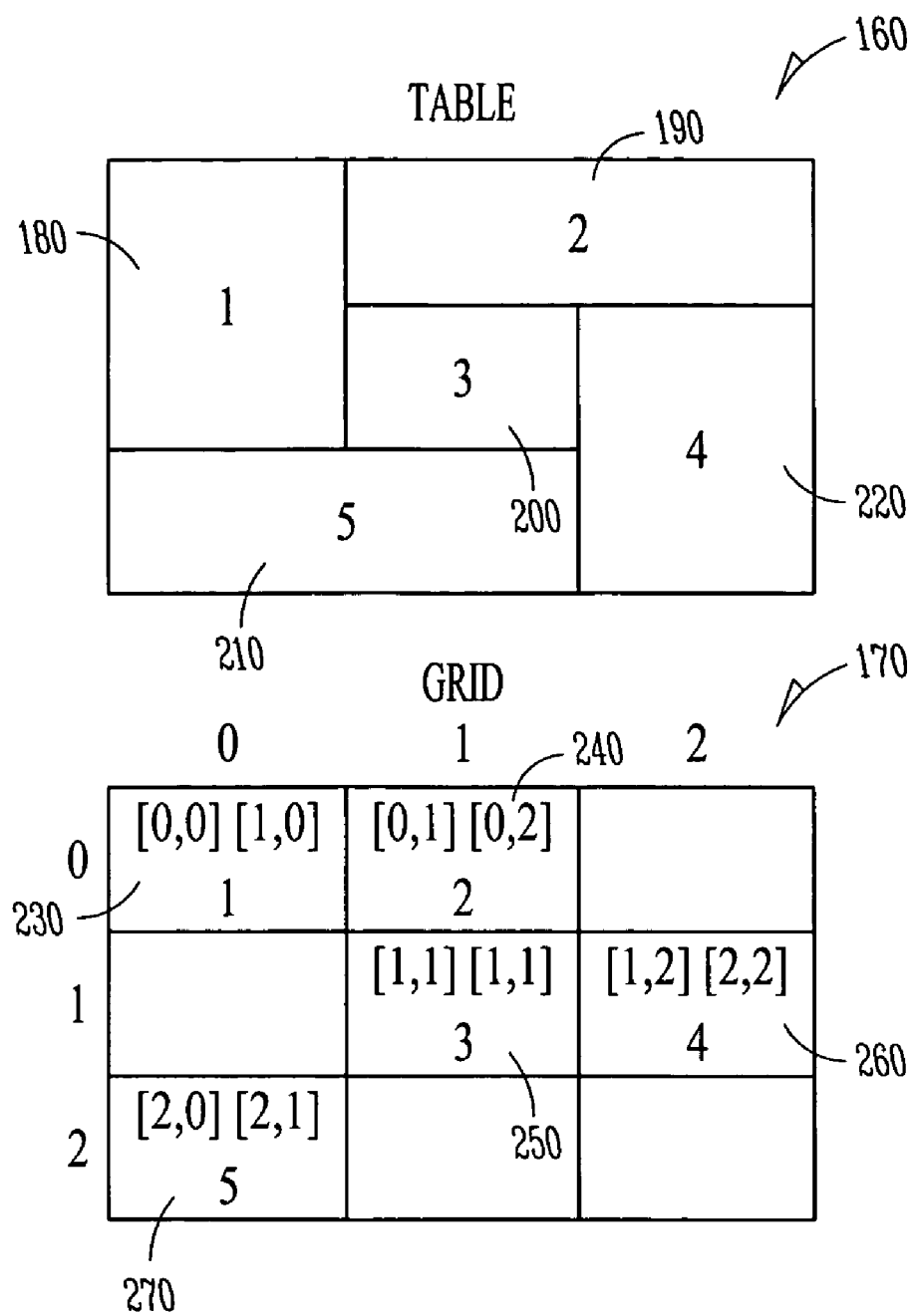
FIG. 3 depicts a diagram of a table and a grid.

As one skilled in the art will appreciate, once the cells and their relative positions are recording in a generic data structure, such as by way of example only, the grid 170 of FIG. 3, rendering the table 160 from the grid 170 becomes a much easier task. Moreover, once the table is represented within the grid 170 modifications may be made to the size of the grid, if desired, such that the table may be rendered to a variety of different media, with each media having varying dimensions. For example, if grid 170 was being used to render table 160 to a standard sized paper, as described above, and later a desire existed to render grid 170 to a legal sized paper, the grid 170 could be automatically adjusted to accommodate this desired transition. As one skilled in the art will appreciate, no additional parsing need take place once a single grid houses the cells of a table along with the relative positions of each cell to one another within the grid.

Furthermore, once a grid is constructed housing the cells of a table, formatting commands may be generated such that the cells may be drawn to a paged media in parallel, to improve performance of fully rendering a complete grid to a paged media. For example, commands may be outputted which are operable to draw each cell independently of other cells, and the execution of each of these drawing commands may be run in parallel, since there is no longer any rows or columns to be concerned with once a grid is produced. Synchronization of the cells may be achieved at different points within the outputted pages, such that commands which draw the cells are executed once a particular cell has its individual top edges determined.

FIG. 1 depicts one example of a flow diagram of a method for rendering tables. A table is received in step 10, tables may be received in a variety of ways, such as by way of example only, from an application, from a file, and others. The format of the table may be in any consistent markup language, which permits the parsing of the table to acquire table information, such as by way of example only, number of rows, number of columns, cell dimensions (e.g. number of columns or rows spanned), data associated with each cell (e.g. text, image, video, audio, and others). As previously discussed, and used for purposes of illustration only, a table may be received in XML or XSL compatible formats and will be readily identified.

Once a table is detected, the cells of the table are parsed in step 20. Parsing text data is well known in the art and a variety of languages exist to assist in automatic parsing, such as by way of example only, C, C++, Perl, Flex, Lex, Yacc, and others. Once the cells of the table are acquired along with any dimensional information which was parsed with the cells from the table, the size of each cell and the number of cells within a grid may be determined, and the relative positions of each cell in step 30 may be calculated.

As previously discussed, the size of the grid may, and the number of cells within the grid may, be determined by the media to which the grid is to be rendered, such as a printed page, or it may be ascertainable from information parsed from the table, such as total number of rows, columns, number of columns spanned, number of rows spanned, and others. Moreover, if a cell has a fixed width within the parsed table, this may be useful in determining the size of the grid, by subtracting from the known size of the grid all the fixed width cells and then distributing the remaining width of the table to the remaining cells. Furthermore, the size of the grid may be configurable by a user such that a manual indication may be used when calculating the size of the grid and the number of equally sized cells with the grid.

Moreover, a grid is used for purposes of illustration but as one skilled in the art will appreciate any data structure would suffice, or combination of data structures. In the present example, the grid may be represented as a double dimensional array, such that access to any particular location within the grid is acquired by referencing two separate indexes where one may be considered indicative of a row and the other indicative of a column within the grid. The data housed within the grid may be represented as a structure, which includes positional information and the data associated with the grid. Although as one skilled in the art will appreciate, the dual index into the arrays is sufficient to discern a cells relative position within the grid and no further information need be carried within the structure associated with a particular location within the grid.

Once the relative positions are determined, the cells and their corresponding data are inserted into the grid in step 40. At this point in time, if not already obtained, the output dimensions associated with a media to which the grid is to be rendered may be received in step 50 and the grid may be reorganized to reflect the appropriate dimensions of this out media. Next, formatting commands are generated in step 60, these commands are operable to draw the cells associated with the grid to the desired media. A variety of programming languages both standard and ad hoc would readily permit such commands to be outputted. For example, PDF, PCL, and other languages both standard or hereinafter developed permit standard executable commands to be generated which will draw lines, circles, and other shapes by instructing a printer to cause ink to be sprayed or displayed on a page. These commands require only dimensional information to be supplied as parameters, which permit such shapes to be drawn on a page. The dimensional information is readily calculated from the grid based on the size of the output page, and each cell s relative position within the grid, as previously presented.

With formatting commands to draw or render each of the cells within the grid, these commands may be executed to render an originally received table to an entirely different media in step 70. These commands, as will be discussed in greater detail below, may be executed in parallel to render the grid optimally to a printed page.

Figure 2:
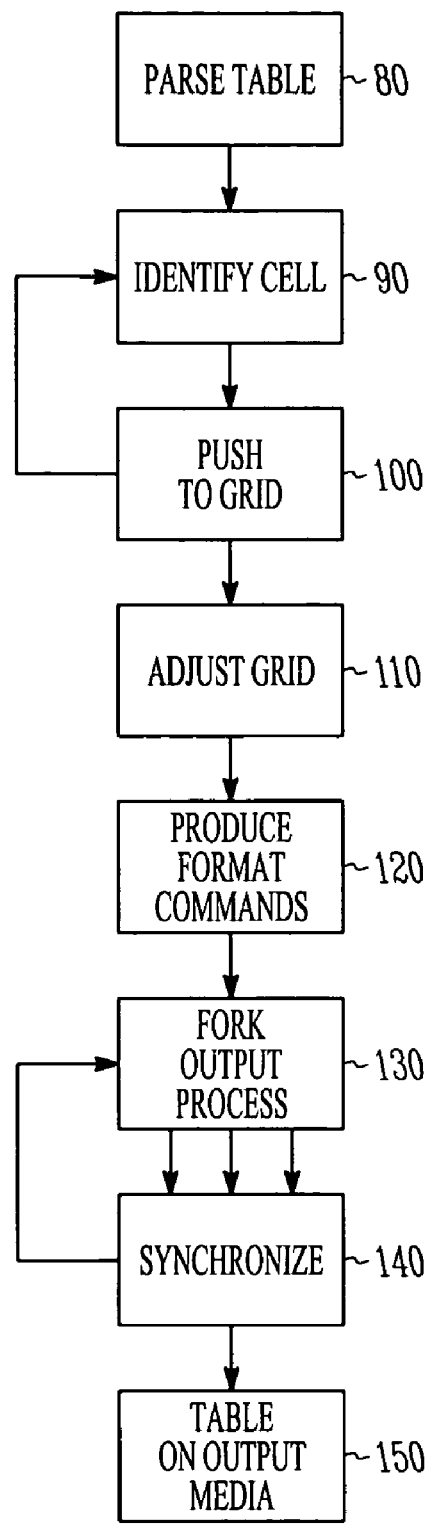
FIG. 2 depicts a flow diagram of a method of producing formatting commands to render tables.

FIG. 2 depicts one flow diagram of a method for producing formatting commands to render tables. A table is parsed in step 80 and each cell within the table is identified in step 90 and pushed to an internal grid in step 100, as previously presented. The grid is adjusted once all cells are received and an output media dimension is known. In step 120, formatting commands to render the grid to an output media are generated for each cell within the grid.

Once the formatting commands are acquired for each cell within the grid, a dispatcher set of executable instructions may drive the execution of each cell to the output media by forking the execution of each cell which has its top border determined in step 130. The dispatcher may associate with each cell a synchronization marker, such that every cell which starts and ends at a same height have the same synchronization markers, and rendering the cells to the output media is synchronized in step 140. Furthermore, once the table is completely represented by independent cells within a grid and associated with independently executable formatting commands, the concepts of rows associated with a table or columns associated with a table are no longer needed, rather, cells may be drawn or rendered to an output media, in parallel with synchronization occurring via a dispatching set of executable instructions. After each cell has been drawn, the original table is completely rendered to an output media in step 150.

As one skilled in the art will appreciate, the ability to independently draw cells of a table to a paged media directly from an original table presented in a browser media, presents a number of advantages for users. In fact, print publishers, and advertisers would save substantially in expenses associated with reformatting browser-based tables for printed publications or reproduction on other media. Moreover, since the execution for drawing the cells to a printed page may occur in parallel, performance associated with the transition is also greatly improved with the present invention.

Figure 4:
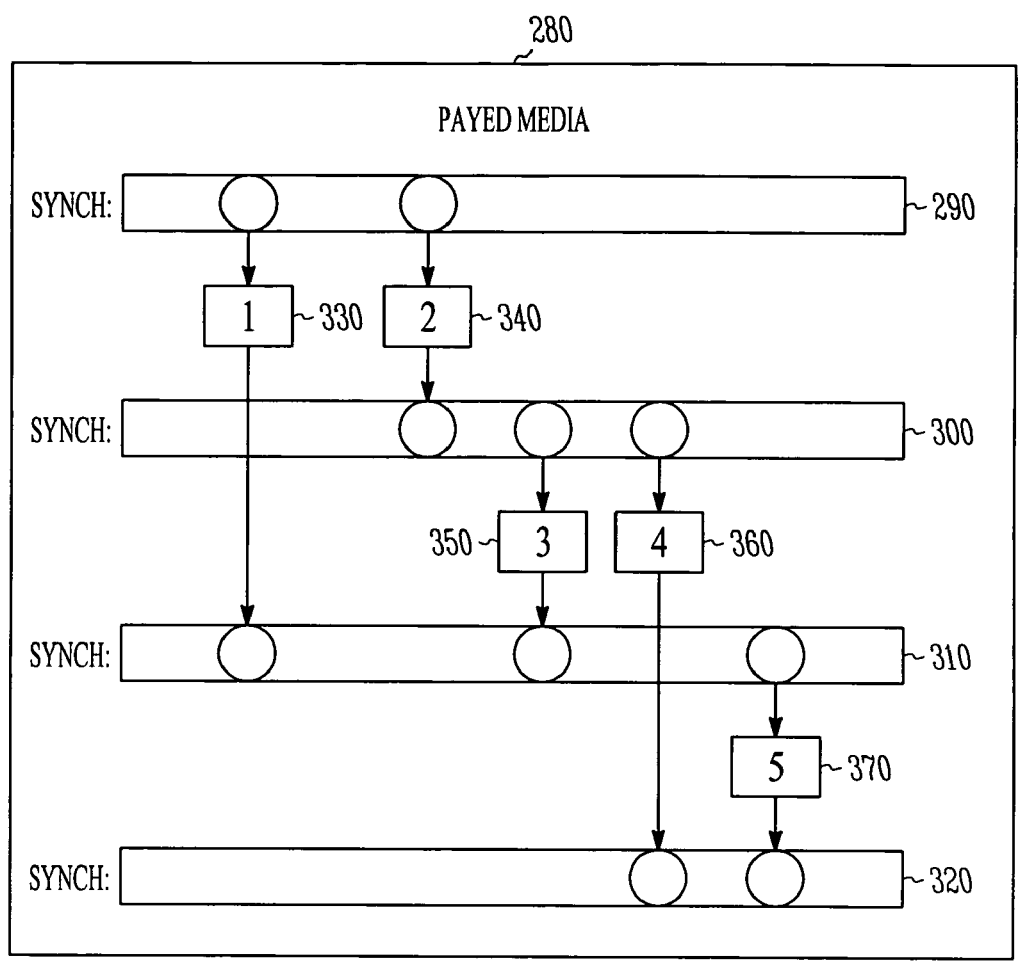
FIG. 4 depicts a block diagram of synchronizing the rendering of a table.

FIG. 4 depicts one block diagram of synchronizing the rendering of a table. A dispatching set of executable instructions 280 is initially prepared to execute formatting commands associated with drawing the cells of a grid in a paged media. At the outset, only cells 1 330 and 2 340 may be executed simultaneously since each of these cells share the same synchronization marker 290. The examples depicted in FIG. 4 correspond to the table 160 and the grid 170 of FIG. 3.

Initially, the top most border of only cell 1 330 and cell 340 are determined, and correspondingly the dispatcher 280 forks the execution of cell 1 330 and cell 340 to the paged media. Thus, cells 1 330 and 2 340 are simultaneously drawn to a printed page. When the dispatcher detects that cell 2 340 has completed, it initiates cells 3 350 and 4 360 for execution since these cells now have their top most border determined and share the same synchronization marker at the completion of the drawing of cell 2 340.

Once cells 1 330 and 3 350 complete, the dispatcher forks cell 5 370 for execution since cell 5 shares a synchronization marker 310, once the drawing of cells 1 330 and 3 350 complete. Finally, when cell 4 360 and cell 5 370 complete execution, a rendition of table 160 of FIG. 3 is reproduced entirely from grid 170 on a printed page, where the drawing of the rendition occurs in parallel, improving rendering performance.

Figure 5:
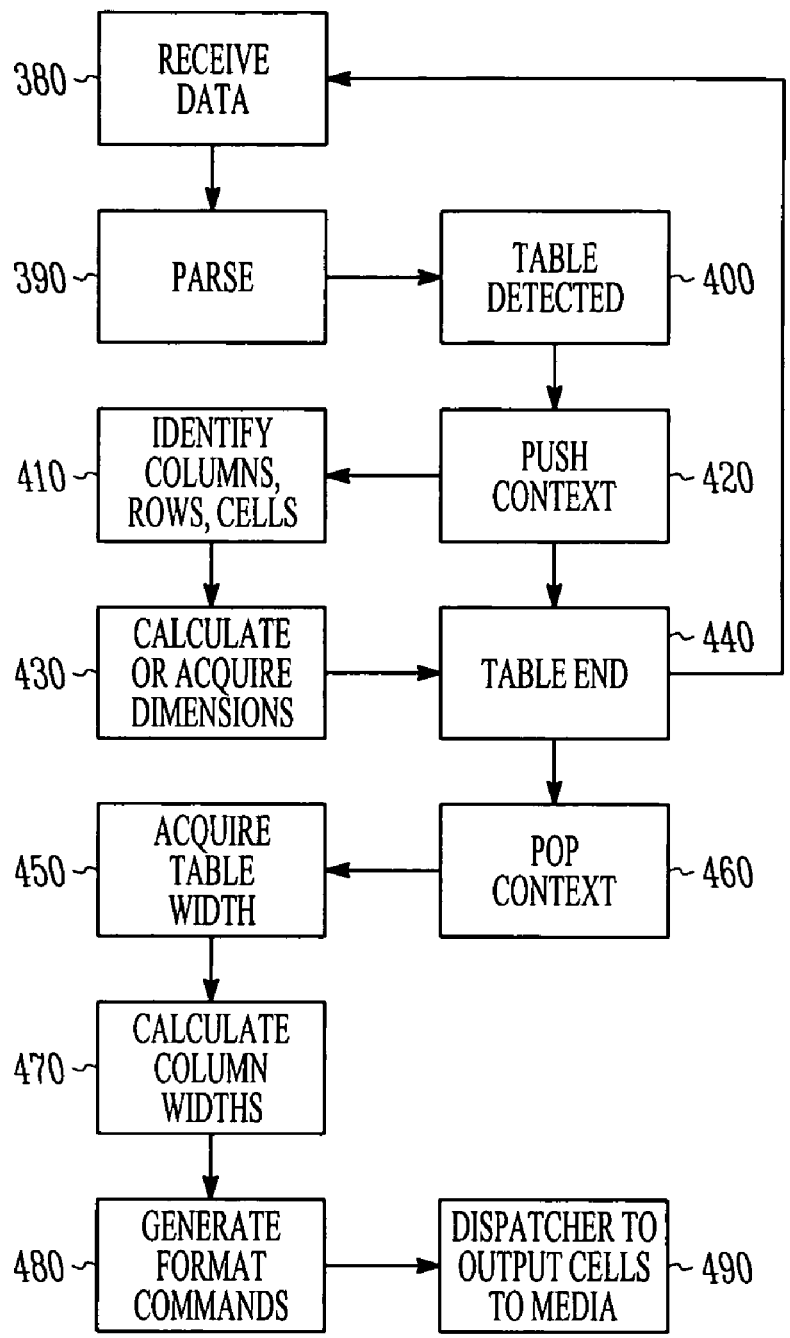
FIG. 5 depicts a flow diagram of a method of rendering tables.

FIG. 5 depicts one flow diagram of a method for rendering tables. Data is received, either in batch mode or in stream, in step 380. The received data is parsed in order to detect instances of tables within the data in step 390. If a table is detected in step 400, its context is stored and pushed to a stack in step 420, this triggers state changes within the parser for detection of columns, rows, cells, and other information regarding the table which follows in step 410.

As previously presented, this information is gathered and dimensions of the parsed cells are either acquired from the data, a user, or calculated in step 430. Next, it is determined if an end of a table is found in step 440, and if so the data continues to be received in step 380, and the stored context is popped off the stack in step 460 where a desired output media table width is acquired in step 450. As previously presented, the column widths within the grid where the cells are housed are calculated in step 470, and formatting commands, operable to generate each cell to an alternate media, are generated in step 480. The formatting commands may then be executed by a dispatching set of executable instructions in step 490 causing each cell to be rendered to the output media, wherein some cells sharing the same synchronization markers are executed in parallel during the rendering of the grid to the output media.

Figure 6:
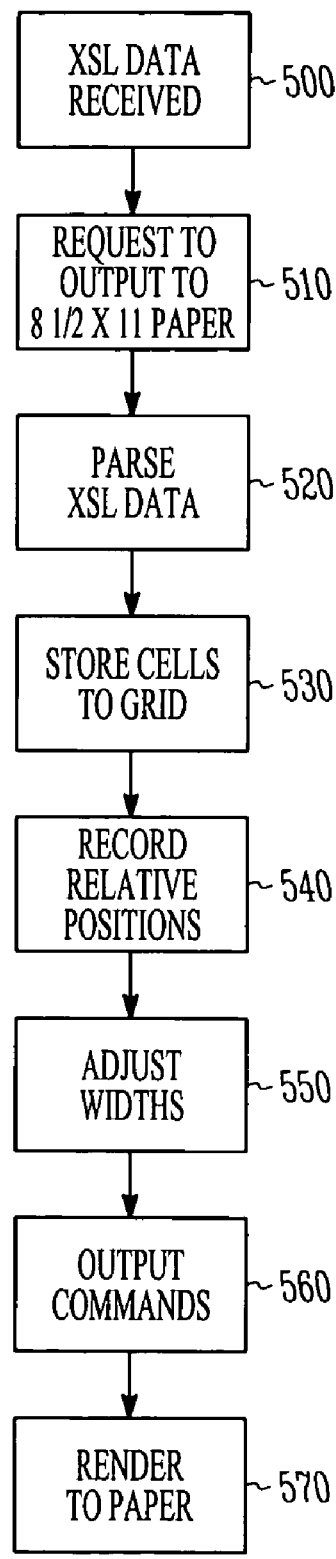
FIG. 6 depicts a flow diagram of a method of rendering tables to an output media.

FIG. 6 depicts one flow diagram of a method for rendering tables to an output media. Initially, a table is detected within the data received in XSL format in step 500 along with a request to render the detected table to an output paper (step 510) having dimensions of 8½ inches by 11 inches, with ½ inches margins on all sides of the paper. The XSL data is parsed in step 520, and detected cells are stored to an internal grid, or matrix in step 530 where the relative positions of each parsed cell is recorded in step 540. Or, as previously presented the relative positions may be deduced from the locations the cell occupies within the internal grid or matrix.

Based on the dimensions of the output page the widths of the cells are adjusted in step 550, and commands generated in a format that cause a printing device to draw the cells to a page are outputted in step 560. The execution of the outputted commands may then be used to produce a rendition of the originally received table in XSL format to a paged media in step 570.

Figure 7:
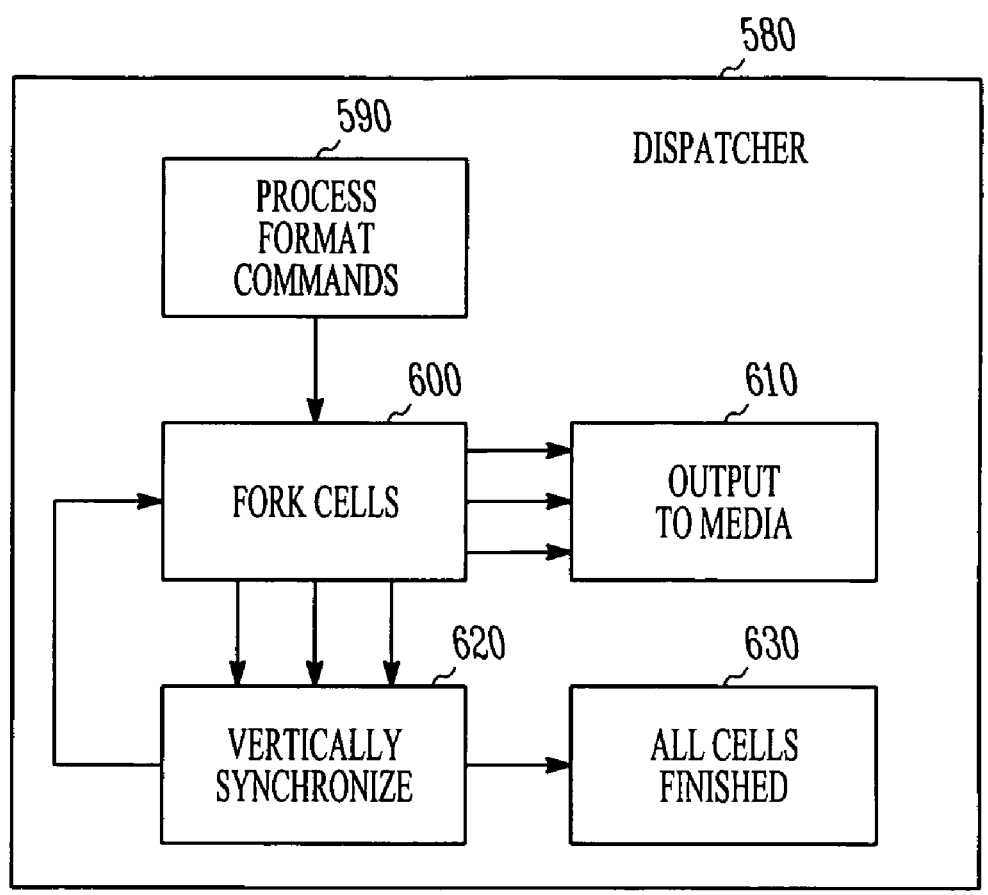
FIG. 7 depicts a block diagram of a method to output cells associated with a table.

FIG. 7 depicts one block diagram of a method to output cells associated with a table. Initially, a dispatching set of executable instructions 580, processes formatting commands in step 590. The formatting commands are executable commands operable to draw cells to a media of a second format and originally associated with a table derived from a media of a first format, such as by way of example only a browser media. The commands include positional information operable to draw shapes onto the media of the second format, such as by way of example only, coordinates associated with a page having dimensions of 8½ inches by 11 inches. The positional information, permits cells which begin and end at the same height to be readily ascertained and associated with vertical synchronization points which are recorded by the dispatcher 580.

Cells sharing the same synchronization markers are forked together and in parallel for execution in step 600, with synchronization managed by the dispatcher 580 in step 620 until all cells are completely rendered in step 630. Once a cell has executed, it is rendered to the output media (e.g. a printed page) in step 610.

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching. For example, although XML and XSL were used as the primary initial data formats before tables are rendered, any data format, which is definable, could be used. Moreover, although the primary examples discuss rendering tables to a printer or paged media, tables may be rendered to application (e.g. fax, additional software modules, intelligent appliances, word processors, viewers, web television, television, and the like). Accordingly, this invention is intended to embrace all alternatives, modifications, and variations that fall within the spirit and broad scope of the attached claims.

What is claimed is:

1. A method implemented in a computer-readable storage medium and to process on a computer for generically rendering a table for output processing, comprising the steps of:
   receiving a table having a plurality of cells wherein each cell spans one or more columns and one or more rows;
   representing the table as a geometric grid wherein one or more positions within the grid house one or more of the cells, and wherein each cell is assigned a synchronization marker; and
   providing a generic table represented by one or more formatting commands operable to provide a rendering of the grid to one or more output media, wherein a size of the generic table is configurable and when the grid is rendered to the one or more output media by processing different ones of the cells representing different aspects of a same version of the generic table in an order defined by each cell's synchronization marker, wherein a number of the cells which have a same synchronization marker are processed together as an independent group, and wherein at least two different cells have the same synchronization marker, and wherein the cells are processed in a sequential order defined by their corresponding synchronization marker to render the grid.

2. The method of claim 1, further comprising the steps of:
   parsing a dimension associated with each cell from the table and associating the dimension with each cell in the grid.

3. The method of claim 1, further comprising the steps of:
   processing the formatting commands to output a rendition of the table on a paged medium.

4. The method on claim 1, wherein the table is received in extensible style sheets language.

5. The method of claim 1, wherein the grid is a rectangle.

6. The method of claim 5, wherein the rectangle is represented as a two dimensional array.

7. The method of claim 1, wherein the formatting commands include one or more relative positions of each cell to one another.

8. A method implemented in a computer-readable storage medium and to process on a computer for producing formatting commands to render a table, comprising the steps of:

decoupling one or more cells from a table, wherein each cell represents a different aspect of a same version of the table;

storing the cells in a matrix;

expressing a dimension associated with each cell in terms of each cell's relative position to each other within the matrix and associating a synchronization marker with each cell; and outputting one or more formatting commands operable to produce a rendition of the table on a output media from the matrix, an wherein each of the one or more formatting commands are processed to render the rendition by processing different ones of the cells that have a same synchronization marker together as a group, and wherein the rendition of the table is produced in a sequential order which is defined by the cells synchronization marker, where like values for a particular synchronization marker are processed together and a range of values for the synchronization markers define the sequential order.

9. The method of claim 8, further comprising the steps of:

executing the formatting commands wherein every cell occupying a single row is rendered to the output media independent of each other.

10. The method of claim 9, further comprising the steps of:

processing the formatting commands vertically on the output media beginning with a first row and continuing to a last row.

11. The method of claim 8, wherein the cells are decoupled from the table by parsing the table represented by a first format.

12. The method of claim 8, further comprising the steps of:

adjusting the dimensions of each cell based on an output media dimension.

13. The method of claim 8, wherein the output media dimension is configurable.

14. The method of claim 8, further comprising:

executing the formatting commands in parallel to produce the rendition of the table on the output media.

15. A method implemented in a computer-readable storage medium and to process on a computer for producing a rendition of a table, comprising the steps of:

representing a plurality of cells for a table with one or more executable commands wherein each command has one or more parameters defining an outputted cell's dimensions on an output media and associating with each cell a synchronization marker, and wherein each cell represents a different aspect of a same version of the table; and executing the commands in parallel to produce a rendition of the table on the output media, and wherein each command processed in parallel to produce the rendition processes against cells in a same group associated with a same synchronization marker, and wherein the rendition of the table is sequentially produced by processing the synchronization markers in a defined order represented by a range of values for the synchronization markers.

16. The method of claim 15, further comprising the steps of:

reformatting the cells of the table to define a dimension of each cell by a relative position of each cell to one another.

17. The method of claim 15, further comprising the steps of:

parsing the cells from the table wherein the table is represented by a first format.

18. The method of claim 17, wherein the first format is extensible style sheets language.

19. The method of claim 15, wherein the output media is a printed page.

20. The method of claim 15, the table and the rendition of the table have different dimensions.

* * * * *

UNITED STATES PATENT AND TRADEMARK OFFICE
CERTIFICATE OF CORRECTION

PATENT NO.        : 7,454,695 B1
APPLICATION NO.   : 09/699572
DATED             : November 18, 2008
INVENTOR(S)       : Grigoriev It is certified that error appears in the above-identified patent and that said Letters Patent is hereby corrected as shown below:

In column 8, line 63, in Claim 4, delete "on" and insert -- of --, therefor.

In column 9, line 17, in Claim 8, delete "an" and insert -- and --, therefor.

Signed and Sealed this

Third Day of February, 2009

JOHN DOLL
*Acting Director of the United States Patent and Trademark Office*